(12) United States Patent
Needham et al.

(10) Patent No.: US 9,113,220 B2
(45) Date of Patent: *Aug. 18, 2015

(54) ELECTRONIC PROGRAM GUIDE FOR OBTAINING PAST, CURRENT, AND FUTURE PROGRAMS

(71) Applicant: Intel Corporation, Santa Clara, CA (US)

(72) Inventors: Bradford H. Needham, North Plains, OR (US); Carl S. Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/079,073

(22) Filed: Nov. 13, 2013

(65) Prior Publication Data

US 2014/0068668 A1 Mar. 6, 2014

Related U.S. Application Data

(63) Continuation of application No. 10/097,203, filed on Mar. 12, 2002, now Pat. No. 8,607,269.

(51) Int. Cl.
| | | |
|---|---|---|
| *G06F 3/00* | (2006.01) | |
| *G06F 13/00* | (2006.01) | |
| *H04N 5/445* | (2011.01) | |
| *H04N 7/18* | (2006.01) | |
| *H04N 7/173* | (2011.01) | |
| *H04N 21/482* | (2011.01) | |
| *H04N 5/76* | (2006.01) | |
| *H04N 21/4147* | (2011.01) | |
| *H04N 21/472* | (2011.01) | |
| *H04N 21/63* | (2011.01) | |

(52) U.S. Cl.
CPC ......... *H04N 21/482* (2013.01); *H04N 5/44543* (2013.01); *H04N 5/76* (2013.01); *H04N 21/4147* (2013.01); *H04N 21/47202* (2013.01); *H04N 21/47214* (2013.01); *H04N 21/4821* (2013.01); *H04N 21/632* (2013.01)

(58) Field of Classification Search
USPC ............. 725/37–61, 86, 87, 91–93, 109, 110, 725/114–116
See application file for complete search history.

(56) References Cited

U.S. PATENT DOCUMENTS

| | | |
|---|---|---|
| 5,585,838 A | 12/1996 | Lawler |
| 5,805,763 A | 9/1998 | Lawler |
| 6,002,394 A | 12/1999 | Schein |

(Continued)

*Primary Examiner* — Nasser Goodarzi
*Assistant Examiner* — Fred Peng
(74) *Attorney, Agent, or Firm* — Trop, Pruner & Hu, P.C.

(57) ABSTRACT

An electronic program guide (EPG) for facilitating obtaining copies of selected programs includes a plurality of program listings, the program listings including listings for previously broadcast programs available for downloading to a user's recording device, programs currently being broadcast available for downloading to the user's recording device, and programs which may be recorded on the user's recording device during a future broadcast of the programs. This EPG merges two models of distribution for broadcast content (e.g., EPGs) and video on demand (VOD) systems (e.g., video catalogs) to address the problem of acquiring a recording of a program that was broadcast in the past. The EPG of the present invention provides a combined, unified user interface whereby a user may easily obtain a copy of any one or more of past, current, or future programs.

13 Claims, 4 Drawing Sheets

(56) References Cited

U.S. PATENT DOCUMENTS

| | | |
|---|---|---|
| 6,215,483 B1 | 4/2001 | Zigmond |
| 6,640,239 B1 | 10/2003 | Gidwani |
| 6,760,043 B2 | 7/2004 | Markel |
| 6,760,918 B2 | 7/2004 | Rodriguez |
| 6,792,007 B1 | 9/2004 | Hamada |
| 6,807,633 B1 | 10/2004 | Pavlik |
| 7,093,272 B1 | 8/2006 | Shah-Nazaroff |
| 7,747,560 B2 | 6/2010 | Goldthwaite |
| 7,908,635 B2 | 3/2011 | Barton |
| 8,312,490 B2 | 11/2012 | Yap |
| 8,607,269 B2 * | 12/2013 | Needham et al. ............... 725/39 |
| 2002/0056123 A1 | 5/2002 | Liwerant |
| 2002/0059606 A1 * | 5/2002 | Kikinis et al. .................. 725/51 |
| 2003/0078969 A1 | 4/2003 | Sprague |

* cited by examiner

ELECTRONIC PROGRAM GUIDE FOR OBTAINING PAST, CURRENT, AND FUTURE PROGRAMS

CROSS-REFERENCE TO RELATED APPLICATIONS

This application is a continuation application based on non-provisional application Ser. No. 10/097,203, filed on Mar. 12, 2002, hereby expressly incorporated by reference herein.

BACKGROUND

This invention relates generally to electronic programming guides for facilitating the selection, viewing, and recording of television programs or other multimedia content.

Electronic programming guides (EPGs) typically display a two dimensional (2D) grid of television (TV) program times on one axis and television channels or service providers on another axis. The EPG grid may include items for particular TV programs, movies, or other multimedia content arranged by channel and time of presentation. The user can typically select any of the programs displayed by the EPG for viewing or recording. This is usually done by selecting a particular current or future program listing using a remote control device to cause the selected program to be automatically tuned for present viewing or scheduled for recording or subsequent (i.e., future) viewing. EPGs typically display limited information about a TV program. The information is usually limited to the title of the program, the time it is broadcast, and the channel broadcasting the program. The information is typically presented in a static text format, with the title resident in the grid slot associated with a particular time and channel combination. One drawback of current EPGs is that they typically display listings only for programs either now being broadcast or programs that will be broadcast in the future.

Personal video recorders (PVRs) are becoming popular as a device used to record programs currently being broadcast or that will be broadcast in the near future. In this sense, they are much like well-known video cassette recorders (VCRs). However, PVRs utilize a hard drive to store the programs in digital form, rather than in analog form on videotape as do VCRs.

Video-on-demand (VOD) systems provide access to previously recorded programs at specified, staggered times. VOD programs are commonly provided by cable TV companies and satellite networks for a fee (e.g., they are usually pay-per-view (PPV) programs).

The user interface for each of these types of systems is very different. The PVR usually provides an EPG as a means for selecting programs, much like a set-top cable TV box or a set-top satellite receiver. In contrast, a VOD system typically provides a catalog metaphor for ordering programs. The catalog may list, at a minimum, the name of a program, a set of times when the program is to be broadcast, and an associated viewing cost. Some VOD systems list available PPV programs in the EPG used for subscription and/or free channels by the cable TV provider or satellite provider.

Neither of the above-described systems allows for a user to easily obtain a copy of a previously broadcast program. One traditional way to acquire a previously broadcast program is to call or write the broadcaster or an affiliated entity to buy a videotape or digital versatile disk (DVD) copy of the program. This involves the user taking a number of steps to get the program, such as finding the right contact information, placing a telephone call, writing a letter, or placing an electronic order using a web browser on the Internet, and arranging for payment and delivery. This is inconvenient to the user.

BRIEF DESCRIPTION OF THE DRAWINGS

The features and advantages of the present invention will become apparent from the following detailed description of the present invention in which.

DETAILED DESCRIPTION

Embodiments of the present invention comprise an electronic program guide (EPG) that merges the two models of distribution for PVRs (e.g., EPGs) and VOD systems (e.g., video catalogs) to address the problem of acquiring a recording of a program that was broadcast in the past. The EPG of the present invention provides a combined, unified user interface whereby a user may easily obtain a copy of any one or more of past, current, or future programs.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
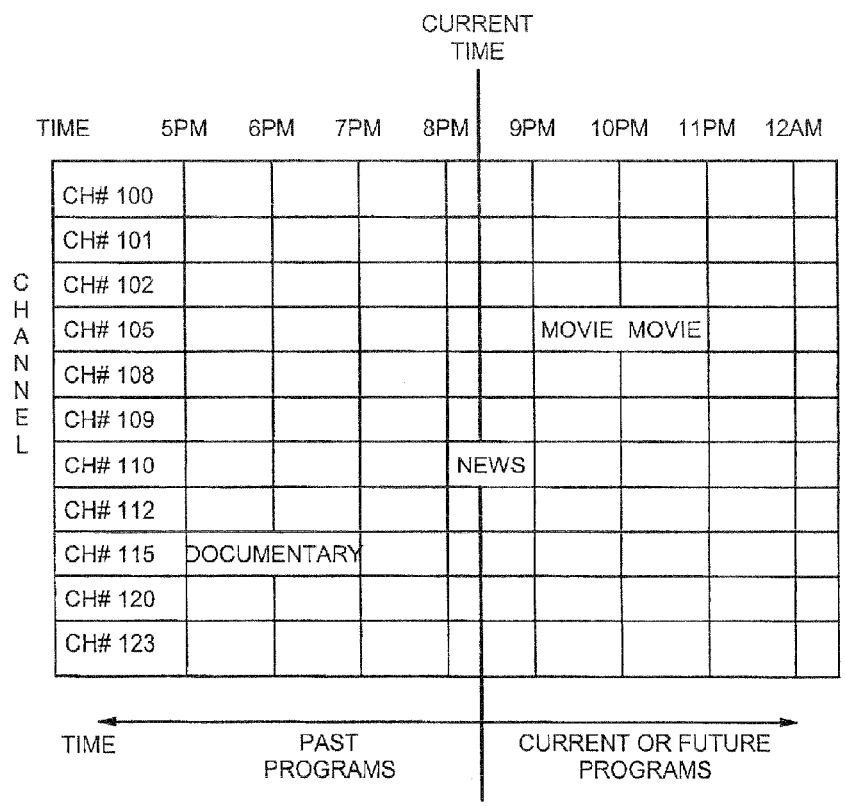
FIG. 1 is an example of a display of a portion of an electronic program guide (EPG) in accordance with an embodiment of the present invention.

Referring to FIG. 1, a sample portion of an EPG graphical user interface according to embodiments of the present invention may include a series of program times corresponding to a current time and date along one axis and a series of channels, TV service providers, or TV networks, along another axis. Thus, a plurality of listings of programs may be shown according to time and channel. Conventionally, the user may select a given program for viewing or recording using a remote control device for any program listing being displayed that is currently being broadcast or will be broadcast in the future. In one embodiment, the EPG display may be in a 2D format (e.g., a conventional grid having time on one axis and channels on another axis) having a plurality of data cells. In other embodiments, the EPG display may be in a 3D format, where a third dimension may be included to give the appearance of depth to the conventional 2D grid using known 3D computer graphics techniques.

Typical prior art EPGs only display listings for programs currently being broadcast or that will be broadcast in the near future (usually later the same day). Current EPGs, however, do not display listings for previously broadcast programs. According to embodiments of the present invention, the EPG may display listings for programs previously broadcast. As shown in the example of FIG. 1, according to embodiments of the present invention, this EPG displays listings for both previously broadcast programs as well as current (that is, in progress) and future programs. Embodiments of the present invention comprise a display and input device that together provide an EPG user interface to allow a user to easily record a copy of a program that is being or will be broadcast, as well as to request a copy of a program that was broadcast previously, which may be available on-demand from a service provider or program source.

As shown in FIG. 1, the EPG of embodiments of the present invention lists past, current, and future broadcasts. There are at least three viewing and recording scenarios that may be addressed by the present invention. First, a user may determine prior to the start of a broadcast that he or she wants to record a selected program. For example, as shown in FIG. 1, suppose the user wants to record the movie to be broadcast on channel number 105 from 9 pm to 11 pm. In this case, the user may use a remote control device to select the program listing shown in the EPG for the upcoming program to be broadcast and to instruct a recording device such as a PVR to record the program when it is broadcast, much as is done conventionally. In one alternate embodiment of this scenario, the user may request that someone else's PVR (e.g., a friend's PVR, a family member's PVR, etc.) that has available disk space be set up to record the program, and then forward a copy of the program to the user's PVR. The communication with the other PVR may be according to any of several well-known communications means (e.g., infrared (IR), radio, telephone, e-mail, instant messaging (IM), and so on). When the program is broadcast, usually at the scheduled time, the user's PVR may receive and record the program.

Secondly, a user may determine in the middle of a broadcast of a selected program that he or she wants a copy of the program. For example, suppose the user wants a copy of the news program currently being broadcast on channel number 110. This program started at 8 pm and the current time is somewhere between 8 pm and 9 pm (e.g., 8:20 pm). However, the user missed the opportunity to request the recording of the program being shown on channel number 110 starting at 8 pm prior to the start of the program. Perhaps the user just turned the TV on at 8:10 pm, watched the program for a few minutes, and then determined that the program was something he or she wanted a copy of to show to a family member or friend. Alternatively, perhaps the user watched the program from the beginning, but then decided during the program that he or she would like a copy of the program. Normally, the user would not be able to recover the missed portion of program being broadcast. Conventionally, the user could start recording using a VCR or PVR at the current time and obtain the rest of the program, but the beginning would be missed. Alternatively, the user could use conventional means to buy the entire program through another sales mechanism (telephone, mail, web, etc.), but this is inconvenient for the user.

With embodiments of the present invention, in this second scenario the user may simply select the program listing in the EPG for the program being broadcast and watched, select an "obtain program copy" input button displayed by the EPG (perhaps in a "pop-up" window)(not shown in FIG. 1) or via another selection mechanism (e.g., a special button on the remote control device for this purpose), and a copy of the program may be communicated from a program source to the user's recording device, such as a PVR, personal computer system (PC), home network server, or other electronic device. A program source may be, for example, a broadcasting network, a cable TV or satellite TV provider, a production company, a content distribution entity, or other distributor of programs. The communication of the program to the user's recording device (e.g., PVR, PC, home network server, or other electronic device) may be accomplished by any means, including, for example, a computer network such as the Internet, a wireless network, and a cable TV or satellite TV network.

Although the program is in the middle of being broadcast, the program source may archive the program in digital form and have the program available for transmission to a user's recording device upon request. Alternatively, the program source may already have the program available for distribution to a requesting user prior to broadcast of the program. In one embodiment, the transmission of the program may be performed in return for a fee paid by the user. In another embodiment, the program may be obtained from another PVR that may have the program stored thereon. This second PVR may have recorded the program while the program was broadcast or may have obtained a copy of the program prior to or subsequent to the broadcast of the program. In this mechanism, a peer to peer (P2P) network of PVRs may be employed.

Thirdly, a user may determine after a program is over that the user would like a copy of the program. Perhaps the user didn't make it home in time to program the user's PVR or VCR prior to the start of the program, or the user learns from a friend or family member after the program was broadcast (e.g., later the same day or on a different, subsequent day) that the program was entertaining and worth obtaining a copy. With embodiments of the present invention, the user may simply select the program listing in the EPG for the desired previously broadcast program, select an "obtain program copy" input button displayed by the EPG (perhaps in a "pop-up" window)(not shown in FIG. 1) or via another selection mechanism (such as a special button on the remote control device for this purpose), and a copy of the previously broadcast program may be communicated from a program source to the user's PVR, computer system, or other electronic device via any of the communications means discussed above. This communication of the program copy may occur immediately after the user's selection or may be performed at a specified later point in time (e.g., in the late evening or middle of the night when more bandwidth or processing power may be available).

For example, as shown in FIG. 1, suppose that the user desires a copy of the documentary that was previously broadcast from 5 pm to 7 pm on channel number 115. The user may use a remote control device to select the program listing in the EPG for this program and directly order a copy of the program to be delivered to the user's recording device (e.g., a PVR, PC, and the like). In one embodiment, the user's PVR may be coupled over a network to communicate with the program source to obtain the requested program. In this case, the PVR receives the requested program over the communications network and stores the program for future use.

As noted, in current EPGs, the user interface (and possibly also the recording device) required to order a program on-demand is completely separate from the user interface to record a program that will be broadcast. If a user discovers, one day after the program's broadcast, that he or she wanted to record it, the user may be required to use an on-demand interface to search a catalog of programs for the desired program. With embodiments of the present invention, a unified user interface for an EPG may be provided which combines the capabilities of obtaining copies of previously broadcast programs and recording of programs to be broadcast in the future. No distinction is made in the user interface of the EPG between past programs, current programs, and future programs, or between video-on-demand or normal broadcast programs. Thus, the interface may be easier to use by to view programs and to obtain copies of selected programs. As noted, in one embodiment, any program copies obtained may be stored on a user's PVR for future viewing.

Figure 2:
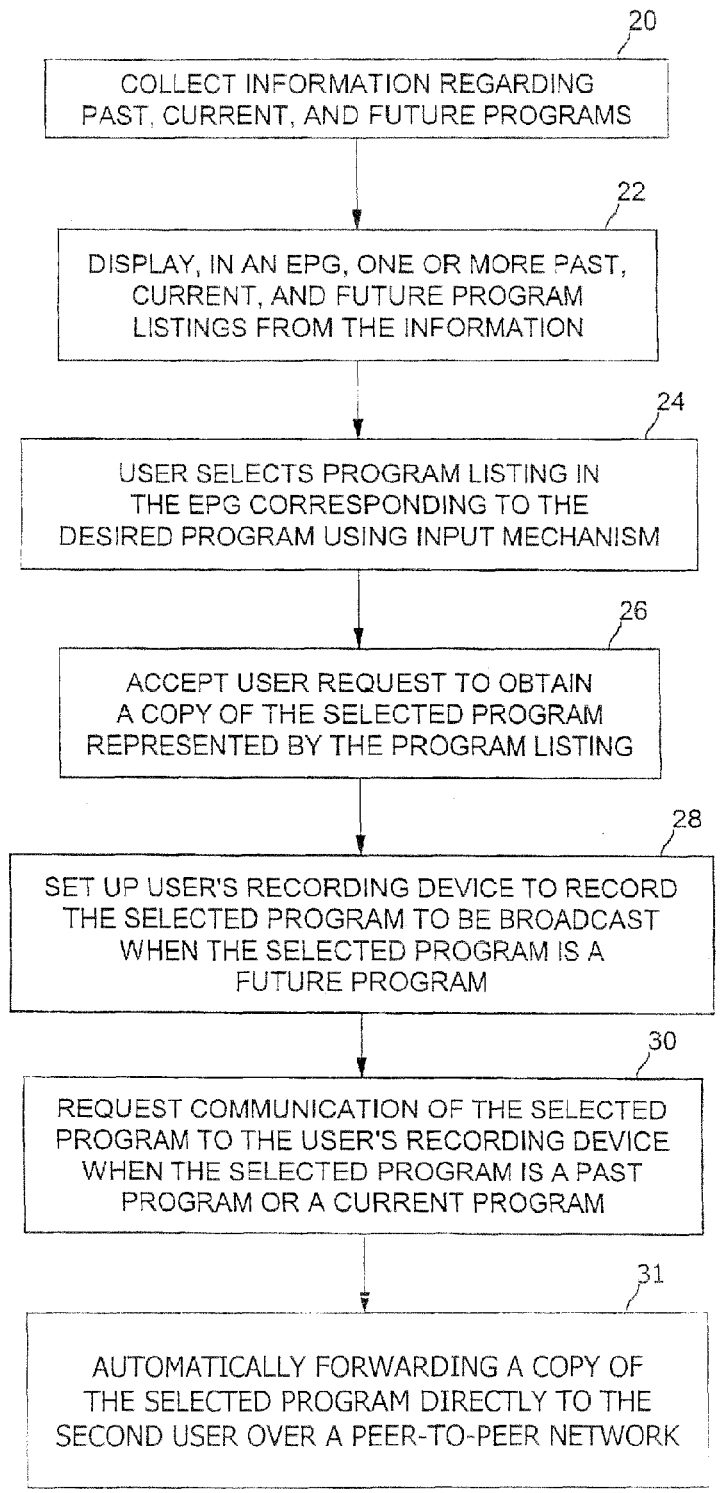
FIG. 2 is a flow chart for a process of providing an EPG for selecting past, current, or future programs in accordance with an embodiment of the present invention.

FIG. 2 is a flow chart of a process of providing an enhanced program listing in an EPG in accordance with an embodiment of the present invention. At block 20, the EPG may collect or otherwise obtain information regarding past, current and future programs. Data collection may be performed as needed by the EPG or based on a periodic schedule. The information collected may comprise information such as title, length, rating, main actors and actresses, category, and so on. At block 22, the EPG may display one or more program listings based on the information collected at block 20. The program listings displayed to the user may include previously broadcast programs (i.e., past programs), currently broadcast programs (i.e., current, in-progress programs) and programs to be broadcast in the future (i.e., future programs). At block 24, the user may select any program listing displayed by the EPG. The user may select a program listing corresponding to a program of which the user would like to obtain a copy. In one embodiment, the copy may be in digital form as recorded onto a storage medium such as a hard disk of a PVR. In one embodiment of the invention, the user may use conventional means for selecting input choices in an EPG, such as a remote control device. The remote control device may be used to highlight a desired program listing and select an "obtain copy" function. In one embodiment the "obtain copy" function may be represented by a button on the remote control device.

At block 26, the EPG accepts the user's request to obtain a copy of the desired program represented by the selected program listing. At block 28, if the selected program is a program to be broadcast in the future, the user's recording device (e.g., a PVR, PC, VCR, home network server, or other electronic device) may be set up to record the program as it is broadcast. At block 30, if the selected program is a program that is currently being broadcast, has previously been broadcast, or is a program available for download without being broadcast (e.g., in the library of available programs from a program source), a request may be sent to a source of the program and, in response to the user's request, the program may be communicated from the program source to the user's recording device.

In various embodiments of the present invention, different indicators may be shown by the EPG in program listings to represent additional information relating to the program. For example, if a program represented by a program listing in the EPG is available for download upon request to a user's recording device, the color of the program listing cell in the EPG and/or text may be set to a first color (e.g., green). If a program is unavailable for downloading, the color of the program listing cell in the EPG and/or text may be set to a second color (e.g., red or gray). If a program is unavailable due to copyright restrictions, the color of the program listing cell may be set to a third color (e.g., black). In another example, programs available for download may be displayed brightly, while unavailable programs may be displayed in a dimmed manner. Alternatively, the colors used for available programs may be an indicator of the cost to the user of downloading the program. In other embodiments, program listings may include information, symbols and/or icons to indicate the image quality of the program that is available for download, copyright information regarding the program (possibly including prohibitions against retransmission of the program), a copy count or copy permissions, bandwidth of the connection required to download the program, parental controls, and other control information.

In one embodiment, rather than downloading the selected past or current program to the user's recording device, the past or current program may be sent to the user by mail on a physical medium such as a videotape or DVD. In this case, the user interface of the present invention may still be used to easily and conveniently select the program of which the user desires a copy. The user may use the remote control device to select and purchase a previously broadcast program, current program, or other available program as displayed by the EPG, and the present EPG responds to the user's selection by processing the order for fulfillment by a program source or other entity.

Figure 3:
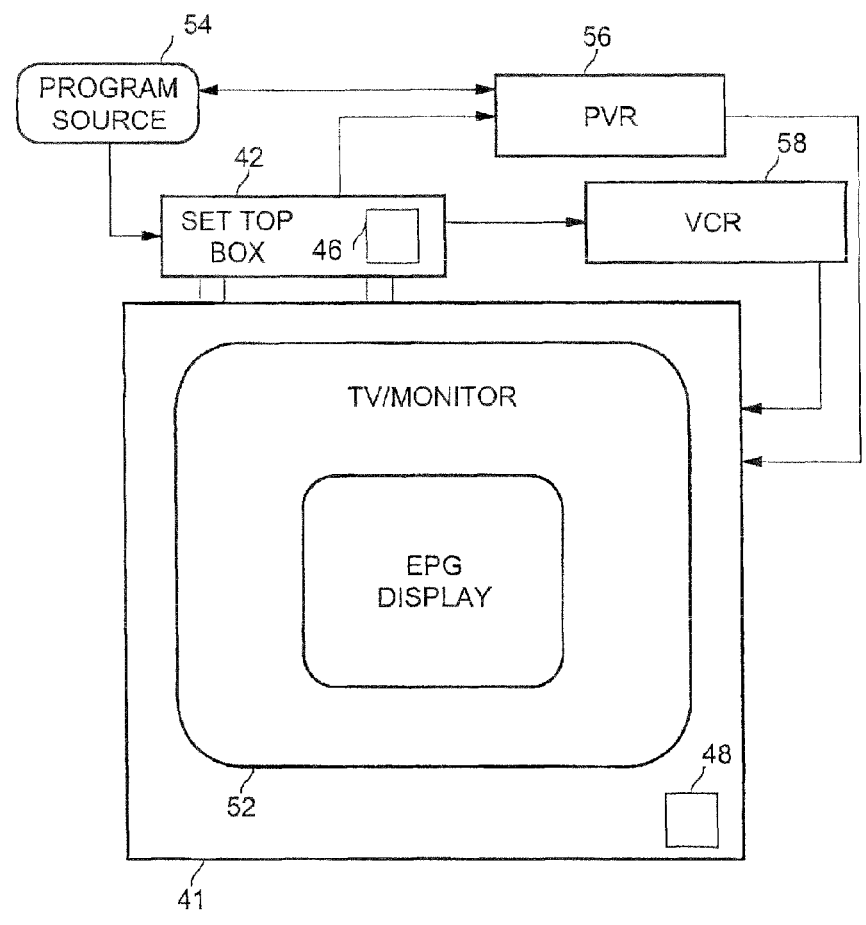
FIG. 3 is a front view of a processor-based system in accordance with an embodiment of the present invention.
Figure 3:
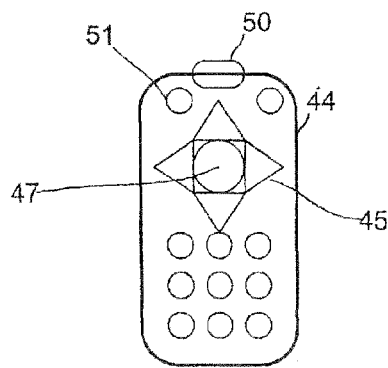

Referring to FIG. 3, in accordance with one embodiment of the present invention, software implementing the improved EPG of the present invention may be stored in and executed by a set-top box 42 that rests atop or near a television receiver 41 having a display screen 52. In other embodiments, a personal computer (PC), home network server, or other processing system may be used in place of the set-top box. A remote control unit 44 may control the television receiver 41, through its interface 48, and the set-top box 42, through its interface 46. The interfaces 50, 48 and 46 may be wireless interfaces, such as infrared interfaces in accordance with one embodiment of the present invention. Although a TV is shown in FIG. 3 as the display device, other displays such as computer monitors may also be used.

A plurality of highlight navigation keys 45 and a select key 47 may be provided on the remote control unit 44 for selection of the various icons, user interface buttons, and program listings displayed by the EPG. Particularly, the navigation keys 45 may be utilized to move the highlighting of a program listing to the desired grid entry of the EPG for the desired program that may be selected using the select button 47. An "obtain copy" button 51 may also be included in the remote control unit to facilitate easy and convenient purchase and/or ordering of a selected program highlighted in the EPG.

Set-top box 46 receives programs from a program source 54. Communication of the programs from the program source to the set-top box may be by any known means for receiving TV and multimedia programming, including cables, satellites, antennas, computer networks, the Internet, and so on. In one embodiment, the set-top box executes the EPG software and, as a result of user interaction with the EPG of the present invention, instructs PVR 56 and/or VCR 58 to record a program to be broadcast. Additionally, the set-top box may, as a result of user interaction with the EPG of the present invention, instruct the PVR to obtain a copy of a desired program from the program source or another source.

Although a particular arrangement of devices is shown in FIG. 3, it will be understood by those skilled in the art that other arrangements are also possible. For example, the functionality of one or more of the set-top box, PVR, VCR, TV and/or monitor may be combined into one device. In one embodiment, the functionality of one or more of the set-top box and PVR may be combined into a home server, computer system, or home entertainment electronics device. Generally, the PVR may communicate with the program source to obtain programs using any available communication mechanism.

Figure 4:
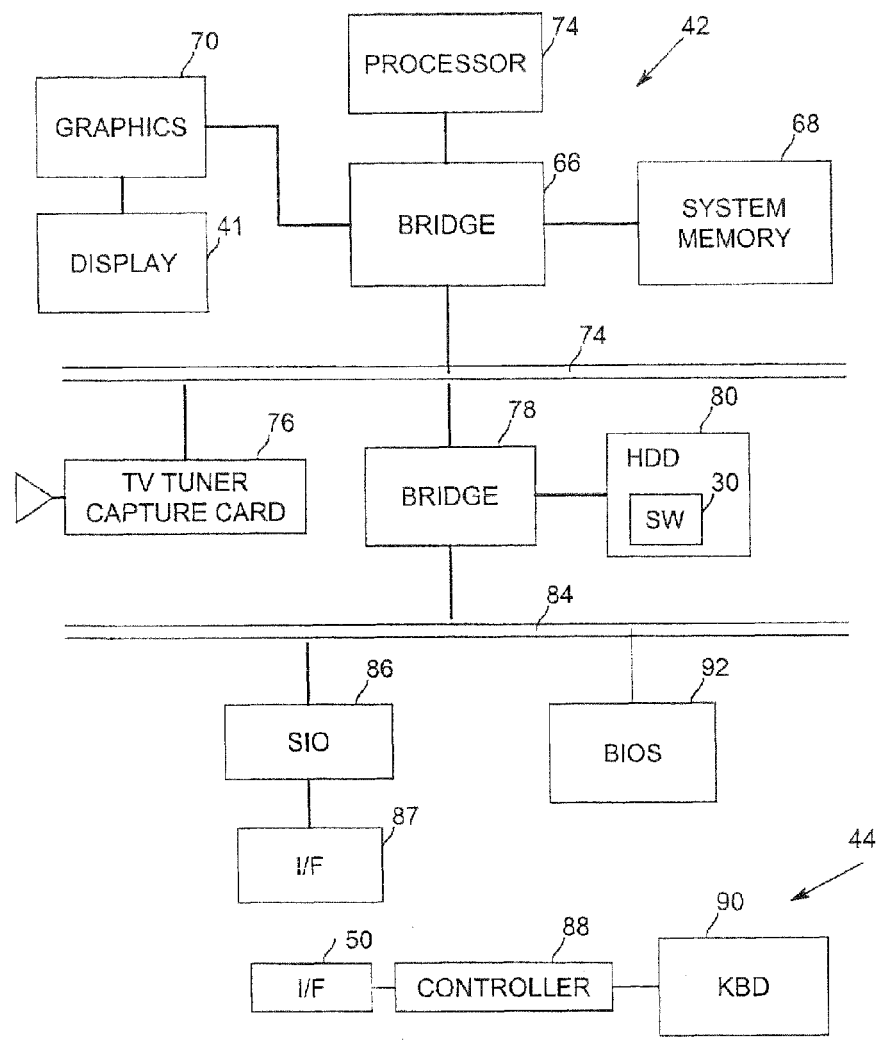
FIG. 4 is a block diagram of a processor-based system in accordance with an embodiment of the present invention.

Referring to FIG. 4, the device used to provide the functionality of one or more of the set-top box 42 and PVR 56 to implement the EPG of embodiments of the present invention may include a processor 74 coupled to a bridge 66. The bridge 66 may couple a graphics accelerator card 70 and a system memory 68. The graphics accelerator card 70 may be coupled to the display or television receiver 41 in one embodiment of the present invention.

The bridge 66 may also couple to a bus 74 that may couple to a television tuner/capture card 76. The card 76 may be coupled to a video source such as a cable or satellite receiver as two examples, although the invention is not limited in this respect. The card 76 may include any circuitry and/or programming to receive programs from a program source. In other embodiments, the programs may be received via a network interface card coupled to the bus. The bus 74 may also be coupled to a bridge 78. The bridge 78 may be coupled to a hard disk drive (HDD) 80 that stores software 30 implementing the improved EPG embodied in the present invention.

The bridge 78 may also be coupled to a bus 84. The bus 84 couples a serial input/output (510) device 86 and a basic input/output system (BIOS) storage 92. The SIO device 86 in turn may be coupled to the interface 87 that communicates with the remote control unit 44. Particularly, the remote control unit 44 may include its own interface 50 coupled to a controller 88. The controller 88 receives input commands from a keyboard or keypad 90.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, set-top boxes, personal digital assistants, and similar devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g., compact read only memory (CD-ROM), digital versatile disk (DVD), hard disk, magnetic disk, or similar medium or device, that is readable by a general or special purpose programmable machine for configuring and operating the machine when the storage medium or device is read by the computer to perform the procedures described herein. The system may also be considered to be implemented as a machine-readable storage medium, configured with a program, where the storage medium so configured causes a machine to operate in a specific manner. Other embodiments are within the scope of the following claims.

While the present invention has been described with respect to a limited number of embodiments, those skilled in the art will appreciate numerous modifications and variations. It is intended that the appended claims cover all such modifications and variations as fall within the true spirit and scope of this present invention.

What is claimed is:

1. A method comprising:
   displaying an electronic programming guide (EPG) graphical user interface to enable selection of a program for viewing on a first computer system that receives television broadcasts;
   if the program has not yet been broadcast, designating a second computer system that receives television broadcasts to automatically record the program and transfer the program to the first computer system; and
   if the program has already been broadcast, locating the program on the second computer system and automatically transfer the program to the first computer system;
   accepting user input pertaining to the displayed portion of the EPG, the user input indicating that the user desires to obtain a copy of a selected program from among the listings in the displayed portion of the EPG;
   if the selected program is a program to be broadcast, setting a recording device to record the selected program; and
   if the selected program is a previously broadcast program, automatically ordering the selected program from a program source, to request delivery of the selected program to the user;
   wherein the displayed portion of the EPG provides a single screen from which the user can (a) request recording of programs to be broadcast and (b) request delivery of previously broadcast programs; and
   wherein displaying comprises using a first color to display the listing for the previously broadcast program that is available for download, and using a second color to display the listing for the previously broadcast program that is not available for download.

2. The method of claim 1, further including receiving a signal from a remote control device, the signal representative of a button of the remote control device being activated by the user to obtain the copy of the selected program.

3. The method of claim 1, further comprising:
   receiving, at the program source, a communication from the recording device, the communication ordering the selected program; and
   in response to receiving the communication at the program source, sending a copy of the selected program from the program source to the user.

4. The method of claim 1 including displaying a portion of the EPG, the portion including listings for previously broadcast programs, listings for programs currently being broadcast, and listings for programs to be broadcast.

5. The method of claim 1 including enabling the second computer system to send the program to the first computer system by email.

6. The method of claim 1 including enabling the second computer system to wirelessly transmit said program to said first computer system.

7. The method of claim 1 including enabling the second computer system to send said program to the first computer system by telephone.

8. An apparatus comprising:
   a processor to display an electronic programming guide (EPG) graphical user interface to enable selection of a program for viewing on said first computer system that receives television broadcasts, if the program has not yet been broadcast, designate a second computer system that receives television broadcasts to automatically record the program and transfer the program to the first computer system, and if the program has already been broadcast, locate the program on the second computer system and automatically transfer the program to the first computer system, accept user input pertaining to the displayed portion of the EPG, the user input indicating that the user desires to obtain a copy of a selected program from among the listings in the displayed portion of the EPG, if the selected program is a program to be broadcast, set a recording device to record the selected program, and if the selected program is a previously broadcast program, automatically order the selected program from a program source, to request delivery of the selected program to the user;
   wherein the displayed portion of the EPG provides a single screen from which the user can (a) request recording of programs to be broadcast and (b) request delivery of previously broadcast programs;

said processor to display by using a first color to display the listing for the previously broadcast program that is available for download and a second color to display the listing for the previously broadcast program that is not available for download; and a memory coupled to said processor.

9. The apparatus of claim 8, said processor to receive a signal from a remote control device, the signal representative of a button of the remote control device being activated by the user to obtain the copy of the selected program.

10. The apparatus of claim 8, including displaying a portion of the EPG, the portion including listings for previously broadcast programs, listings for programs currently being broadcast, and listings for programs to be broadcast.

11. A system comprising:

a first computer system;

a processor to display an electronic programming guide (EPG) graphical user interface to enable selection of a program for viewing on said first computer system that receives television broadcasts, if the program has not yet been broadcast, designate a second computer system that receives television broadcasts to automatically record the program and transfer the program to the first computer system, and if the program has already been broadcast, locate the program on the second computer system and automatically transfer the program to the first computer system, accept user input pertaining to the displayed portion of the EPG, the user input indicating that the user desires to obtain a copy of a selected program from among the listings in the displayed portion of the EPG, if the selected program is a program to be broadcast, set a recording device to record the selected program, and if the selected program is a previously broadcast program, automatically order the selected program from a program source, to request delivery of the selected program to the user;

wherein the displayed portion of the EPG provides a single screen from which the user can (a) request recording of programs to be broadcast and (b) request delivery of previously broadcast programs;

said processor to display by using a first color to display the listing for the previously broadcast program that is available for download and a second color to display the listing for the previously broadcast program that is not available for download; and a memory coupled to said processor.

12. The system of claim 11, said processor to receive a signal from a remote control device, the signal representative of a button of the remote control device being activated by the user to obtain the copy of the selected program.

13. The system of claim 11, said processor to display a portion of the EPG, the portion including listings for previously broadcast programs, listings for programs currently being broadcast, and listings for programs to be broadcast.

* * * * *